(12) United States Patent
Garosshen (10) Patent No.: US 10,301,950 B2
(45) Date of Patent: May 28, 2019

(54) ENHANCED PROTECTION FOR ALUMINUM FAN BLADE VIA SACRIFICIAL LAYER

(71) Applicant: UNITED TECHNOLOGIES CORPORATION, Farmington, CT (US)

(72) Inventor: Thomas J. Garosshen, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 745 days.

(21) Appl. No.: 14/763,058

(22) PCT Filed: Feb. 21, 2014

(86) PCT No.: PCT/US2014/017701
§ 371 (c)(1),
(2) Date: Jul. 23, 2015

(87) PCT Pub. No.: WO2014/149365
PCT Pub. Date: Sep. 25, 2014

(65) Prior Publication Data
US 2015/0354376 A1  Dec. 10, 2015

Related U.S. Application Data

(60) Provisional application No. 61/790,775, filed on Mar. 15, 2013, provisional application No. 61/847,771, filed on Jul. 18, 2013.

(51) Int. Cl.
*F01D 5/28* (2006.01)
*F02C 3/04* (2006.01)
(Continued)

(52) U.S. Cl.
CPC ............ *F01D 5/28* (2013.01); *C23F 13/08* (2013.01); *C23F 13/14* (2013.01); *F02C 3/04* (2013.01)

(58) Field of Classification Search
CPC .. F01D 5/28; F01D 5/286; C23F 13/08; C23F 13/14
(Continued)

(56) References Cited

U.S. PATENT DOCUMENTS 3,870,615 A    3/1975  Wilson et al.
4,340,616 A *  7/1982  Weinert ................ B02C 17/22
                                              241/170
(Continued)

FOREIGN PATENT DOCUMENTS

EP    2226409 A2    3/2011
JP    2000-204902 A    7/2000
JP    2002-047587 A    2/2002

OTHER PUBLICATIONS

Extended European Search Report; Application No. 14770994.3; dated Sep. 30, 2016; 7 Pages.
(Continued)

*Primary Examiner* — Timothy L Maust
(74) *Attorney, Agent, or Firm* — Cantor Colburn LLP (57) ABSTRACT

A component is described which may comprise a structure formed from a material selected from the group consisting of aluminum and an aluminum alloy. The component may further comprise a sacrificial layer in electrical contact with at least a portion of a surface of the structure. The sacrificial layer may protect the surface from localized corrosion and may comprise an alloy that is more anodic than the material forming the structure. The alloy may be selected from the group consisting of an aluminum alloy and a zinc alloy.

17 Claims, 6 Drawing Sheets

(51) Int. Cl.
*C23F 13/14* (2006.01)
*C23F 13/08* (2006.01)

(58) Field of Classification Search
USPC .................................................. 416/241 R
See application file for complete search history.

(56) References Cited

U.S. PATENT DOCUMENTS

| | | | | |
|---|---|---|---|---|
| 5,098,797 | A * | 3/1992 | Haskell | C23C 22/74 |
| | | | | 416/241 B |
| 5,989,734 | A | 11/1999 | Miura et al. | |
| 6,043,451 | A * | 3/2000 | Julien | C23C 4/02 |
| | | | | 219/121.43 |
| 6,685,429 | B2 * | 2/2004 | Webster | C21D 10/00 |
| | | | | 29/889.21 |
| 6,702,553 | B1 | 3/2004 | Gorman | |
| 7,247,348 | B2 * | 7/2007 | Power | F01D 5/288 |
| | | | | 204/192.1 |
| 7,374,825 | B2 * | 5/2008 | Hazel | C23C 28/321 |
| | | | | 416/241 B |
| 7,472,740 | B2 * | 1/2009 | Anderson | B22D 11/007 |
| | | | | 164/461 |
| 7,794,197 | B2 * | 9/2010 | Thompson | F01D 5/147 |
| | | | | 415/9 |
| 8,231,958 | B2 * | 7/2012 | Hoover | F01D 5/288 |
| | | | | 427/316 |
| 8,303,247 | B2 * | 11/2012 | Schlichting | F01D 11/122 |
| | | | | 29/424 |
| 8,349,470 | B2 * | 1/2013 | Marois | B32B 15/016 |
| | | | | 165/905 |
| 8,556,579 | B2 * | 10/2013 | Jevons | F01D 5/20 |
| | | | | 415/173.4 |
| 8,790,789 | B2 * | 7/2014 | Ramgopal | C23C 4/06 |
| | | | | 416/241 R |
| 8,834,126 | B2 * | 9/2014 | Hansen | B23P 9/04 |
| | | | | 29/458 |
| 9,364,857 | B1 * | 6/2016 | Uhl | B05D 5/04 |
| 9,453,418 | B2 * | 9/2016 | Hui | F01D 5/147 |
| 9,957,972 | B2 * | 5/2018 | Foster | F04D 29/023 |
| 2010/0159272 | A1 | 6/2010 | Marois et al. | |
| 2010/0226783 | A1 * | 9/2010 | Lipkin | C23C 4/06 |
| | | | | 416/241 B |
| 2010/0247321 | A1 | 9/2010 | Kullarni et al. | |
| 2013/0004323 | A1 | 1/2013 | Hanson et al. | |

OTHER PUBLICATIONS

International Search Report Application No. PCT/US2014/017701 dated Jun. 11, 2014.

European Office Action for Application No. 14 770 994.3; dated Feb. 5, 2018.

* cited by examiner

ENHANCED PROTECTION FOR ALUMINUM FAN BLADE VIA SACRIFICIAL LAYER

CROSS-REFERENCE TO RELATED APPLICATION

This patent application is a US National Stage under 35 U.S.C. § 371, claiming priority to International Application No. PCT/US14/17701 filed on Feb. 21, 2014, which claims priority under 35 U.S.C. § 119(e) to U.S. Patent Application Ser. No. 61/790,775 filed on Mar. 15, 2013, and 61/847,771 filed on Jul. 18, 2013.

FIELD OF DISCLOSURE

The present disclosure generally relates to providing structures protected from corrosion and, more specifically, relates to aluminum and aluminum alloy-based structures protected from localized corrosion with sacrificial layers.

BACKGROUND

Aluminum and aluminum alloys are desirable materials for component fabrication in many industries, such as aircraft and automotive industries, because they are strong, relatively inexpensive, lightweight, and generally resistant to corrosion. The corrosion resistance of aluminum and aluminum alloys results from self-renewing passive oxide films that develop on their surfaces and advantageously create a barrier against corrosion. While effective, the passive oxide films may break down locally causing small areas of the aluminum alloy to become exposed for localized corrosion in the form of pitting corrosion, intergranular attack, crevice corrosion, and stress cracking corrosion. Such localized corrosion may occur, for example, when the exposed areas of the aluminum or aluminum alloy come into contact with corrosive agents in the environment such as water, air, and chlorides. The susceptibility of aluminum and aluminum alloys to localized corrosion may limit the use of these materials, for example, in fan blades and compressor airfoils in gas turbine engines of aircraft, which frequently operate near coastal environments containing high levels of corrosive chlorides from wind-blown seawater mist. As such, fan blades in gas turbine engines are frequently made from heavier and more expensive metals such as titanium.

The development of strategies designed to protect aluminum and aluminum alloy based structures from localized corrosion may be advantageous for promoting the use of these materials in a variety of industries. One strategy may be to apply paint coatings, such as chromated epoxy based primers, to the surfaces of aluminum alloy fan blades and compressor airfoils to form a barrier that shields the surfaces from coming into direct contact with corrosive agents in the environment. However, if introduced into gas turbine fan blades and compressor airfoils, such coatings may be short lived as they may be subject to erosion and/or damage upon impact with foreign objects such as birds, ice, and sand during fan operation.

One known approach for protecting steel structures from corrosion involves introducing a sacrificial anode in electrical contact (such as metal to metal contact) with a portion of a surface of the steel structure. This strategy has been described, for example, in U.S. Pat. No. 3,870,615 and has been successfully applied for the protection of steel hulls of ships, offshore oil rigs, as well as pipelines which would otherwise be exposed to the corrosive effects of seawater or groundwater. The sacrificial anodes may protect such steel structures from corrosion by a cathodic protection mechanism in which the sacrificial anode is preferentially corroded over the steel structure upon exposure to corrosive conditions in the environment. In this regard, the sacrificial anode may be formed from a metal such as zinc, magnesium, or aluminum, which have lower electrochemical potentials that the iron material forming the steel, in order to provide a driving force for the sacrificial anode to preferentially corrode. In the presence of water and electrolyte, the sacrificial anode and steel structure create a galvanic cell, with oxidation (corrosion) occurring at the sacrificial anode and the released electrons being shuttled to the steel structure. Once the sacrificial anode has been substantially consumed by corrosion, a new sacrificial anode layer may be applied to the surface of the steel structure to further extend protection.

The development of similar cathodic protection strategies for aluminum and aluminum alloy based structures are still wanting, however. Clearly, a system is needed to protect aluminum and aluminum alloy structures from localized corrosion in order to reduce or minimize the risks of structural failure.

SUMMARY OF THE DISCLOSURE

In accordance with one aspect of the present disclosure, a component is disclosed. The component may comprise a structure formed from a material selected from the group consisting of aluminum and an aluminum alloy. The component may further comprise a sacrificial layer in electrical contact with a portion of a surface of the structure. The sacrificial layer may protect the surface from localized corrosion and may comprise an alloy that is more anodic than the material forming the structure. The alloy may be selected from the group consisting of aluminum, an aluminum alloy and a zinc alloy.

In another refinement, the sacrificial layer may comprise an anodic element selected from the group consisting of zinc, magnesium, beryllium, and combinations thereof.

In another refinement, the sacrificial layer may have an electrochemical potential at least 100 mV lower than the electrochemical potential of the material forming the structure.

In another refinement, the anodic element may be present in the range of about 0.25 wt % to about 10 wt %.

In another refinement, the sacrificial layer may further comprise a first element selected from the group consisting of indium, barium, magnesium, mercury, gallium, thallium, and combinations thereof combined into a predominately aluminum alloy or layer that also contains from about 0.25 to about 5% zinc.

In another refinement, the sacrificial layer may further comprise a second element selected from the group consisting of iron, silicon, and combinations thereof combined into a predominately aluminum alloy or layer that also contains from about 0.25 to about 5% zinc.

In another refinement, the first element may be present in the sacrificial layer at less than about 1 wt %.

In another refinement, the second element may be present in the sacrificial layer up to about 1 wt %.

In another refinement, the sacrificial layer may be deposited on the surface of the structure by at least one deposition method selected from the group consisting of cold spraying, electroplating, chemical vapor deposition, physical vapor deposition, plasma spraying, slurry application, sintering, and diffusion bonding.

In another refinement, the component may further comprise a paint coating on the sacrificial layer.

In another refinement, the structure may be a fan blade of fan of a gas turbine engine.

In another refinement, the sacrificial layer may be deposited on at least one of an outer surface and an inner surface of the fan blade.

In another refinement, the sacrificial layer may be deposited on a wear pad of the fan blade.

In accordance with another aspect, an airfoil for a fan of a gas turbine engine is disclosed. The airfoil may comprise a blade portion and a root portion. The airfoil may be formed from a material selected from the group consisting of aluminum and an aluminum alloy. The airfoil may further comprise a sacrificial layer in electrical contact with at least a portion of a surface of the fan blade. The sacrificial layer may protect the surface from localized corrosion and may comprise an alloy that is more anodic than the material forming the fan blade. The alloy may be selected from the group consisting of an aluminum alloy and a zinc alloy.

In another refinement, the sacrificial layer may comprise an anodic element selected from the group consisting of zinc, magnesium, beryllium, and combinations thereof.

In another refinement, the sacrificial layer may further comprise a first element selected from the group consisting of indium, barium, magnesium, mercury, gallium, thallium, and combinations thereof combined into a predominately aluminum alloy or layer that also contains from about 0.25 to about 5% zinc.

In another refinement, the sacrificial layer may further comprise a second element selected from the group consisting of iron, silicon, and combinations thereof combined into a predominately aluminum alloy or layer that also contains from about 0.25 to about 5% zinc.

In accordance with another aspect, a gas turbine engine is disclosed. The gas turbine engine may comprise a fan having a plurality of airfoils connected to a hub and at least one of the plurality of airfoils may be formed from a material selected from the group consisting of aluminum and an aluminum alloy. The gas turbine engine may further comprise a sacrificial layer in electrical contact with at least a portion of a surface of the at least one of the plurality of airfoils. The sacrificial layer may protect the surface from localized corrosion and may be formed from an alloy that is more anodic than the material. The alloy may be selected from the group consisting of an aluminum alloy and a zinc alloy. The gas turbine engine may further comprise a compressor downstream of the fan, a combustor downstream of the compressor, a turbine downstream of the combustor, and a nacelle surrounding the fan, the compressor, the combustor, and the turbine.

In another refinement, the sacrificial layer may comprise an anodic element selected from the group consisting of zinc, magnesium, beryllium, and combinations thereof.

In another refinement, the sacrificial layer may further comprise a first element selected from the group consisting of indium, barium, magnesium, mercury, gallium, thallium, and combinations thereof combined into a predominately aluminum alloy or layer that also contains from about 0.25 to about 5% zinc.

In another refinement, the sacrificial layer may further comprise a second element selected from the group consisting of iron, silicon, and combinations thereof combined into a predominately aluminum alloy or layer that also contains from about 0.25 to about 5% zinc.

These and other aspects and features of the present disclosure will be more readily understood when read in conjunction with the accompanying drawings.

It should be understood that the drawings are not necessarily drawn to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments disclosed herein.

DETAILED DESCRIPTION

Figure 1:
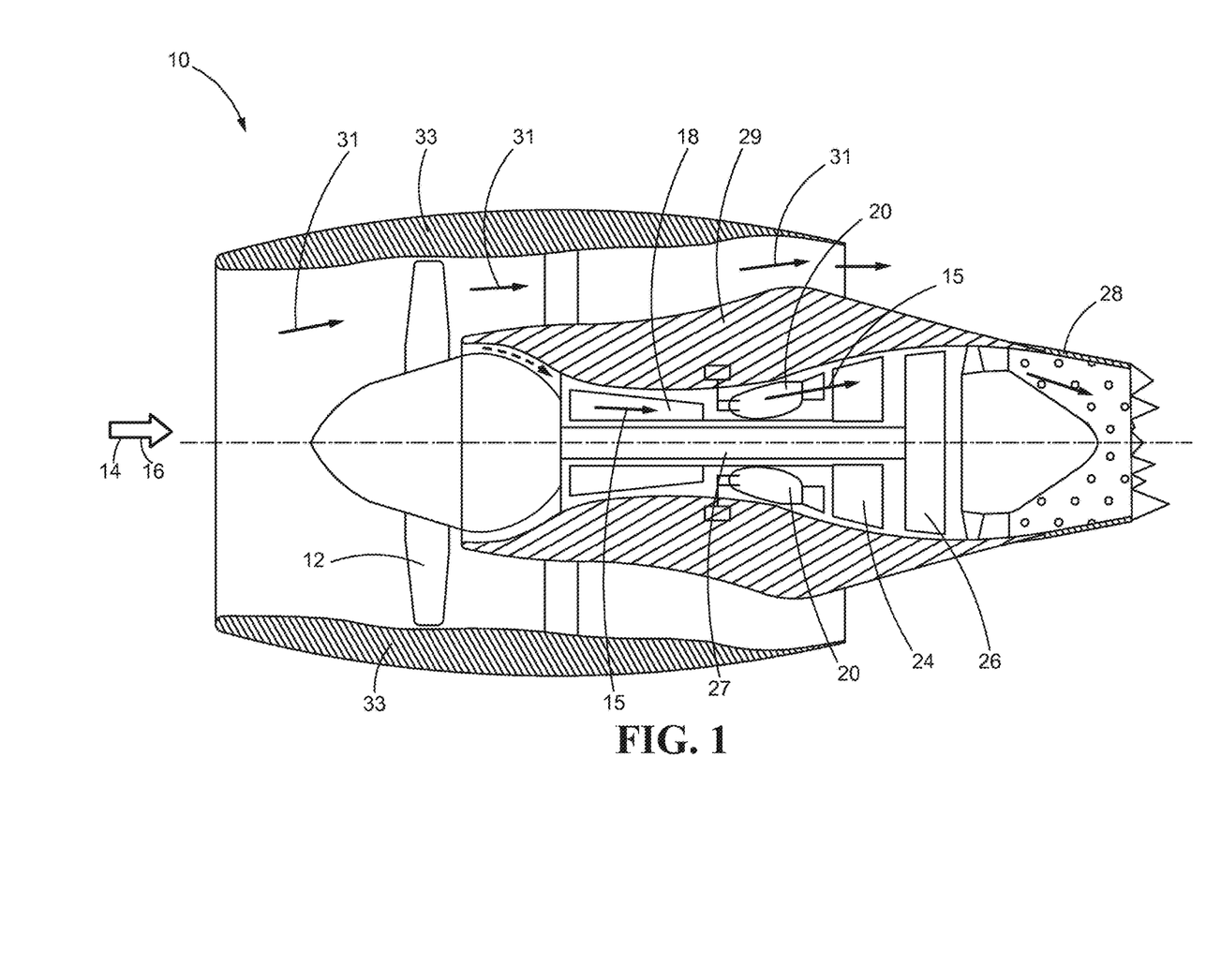
FIG. 1 is a cross-sectional view of a gas turbine engine constructed in accordance with the present disclosure.

Referring now to the drawings, and with specific reference to FIG. 1, a gas turbine engine 10 is shown. It may be used to provide propulsive thrust to an associated aircraft or to generate power if used in land-based operations. The gas turbine engine 10 may have a fan 12 which may accelerate incoming air 14 through the engine 10 in an upstream to downstream direction 16, as shown.

In normal operation, air 14 may be drawn into the engine 10 and may be accelerated by the fan 12. After passing the fan 12, a fraction of the incoming air 14 may be routed through a gas path 15 defined by one more compressor sections 18, one or more combustors 20, and one or more turbine sections 24 and 26 in an upstream to downstream direction, as shown. The compressor section 18, the combustor 20, and the turbines 24 and 26 may be within a case 29. In the gas path 15, the air 14 may first be compressed and pressurized in the compressor section 18 before being delivered to combustors 20 where the air is mixed with fuel and combusted. The hot combustion products may then expand through and drive the turbines 24 and 26 which may, in turn, drive the compressor section and the fan 12 by driving the rotation of an interconnecting shaft 27, as shown. After passing through the turbine section 24, the air 14 may be exhausted through an exhaust nozzle 28 to provide some, for example about 20%, of propulsive thrust to an associated aircraft. The remaining propulsive thrust may be provided by air 14 passing through a bypass pathway 31 located between the case 29 and a nacelle 33 surrounding the fan 12 and the case 29, as shown.

Figure 2:
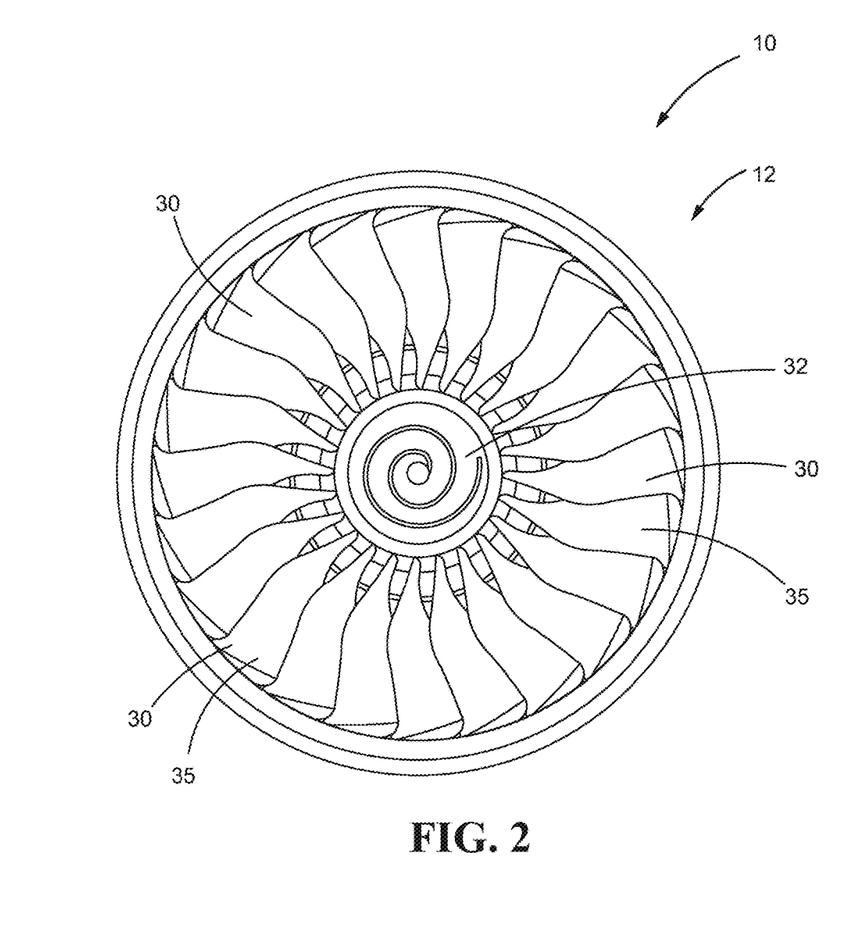
FIG. 2 is a front view of a fan of the gas turbine engine constructed in accordance with the present disclosure.

A more detailed view of the fan 12 of the gas turbine engine 10 is shown in FIG. 2. The fan 12 may have a plurality of airfoils 30 connected to a central hub 32, as shown, or the airfoils 30 and the central hub 32 may be formed as a unitary part. One or more of the airfoils 30 (and/or compressor airfoils) of the gas turbine engine 10 may be formed from an aluminum alloy or aluminum. The airfoils 30 (and/or compressor airfoils) formed from aluminum or an aluminum alloy may exhibit enhanced resistance against localized corrosion by virtue of a sacrificial layer 40 deposited on at least a portion of their outer and/or inner surfaces (see FIGS. 4-5 and further details below). The sacrificial layer 40 may protect the airfoils 30 from localized corrosion by forming a barrier that may be corroded away and sacrificed before the underlying aluminum alloy or aluminum materials of the airfoils 30 are exposed to corrosive conditions in the environment, such as sea water mist. Accordingly, the sacrificial layer 40 may improve the structural stability and extend the operative lifetime of the airfoils 30. As another possibility, the airfoils 30 may be airfoils in the compressor section of the gas turbine engine, and may be protected from localized corrosion by the sacrificial layer 40.

Figure 3:
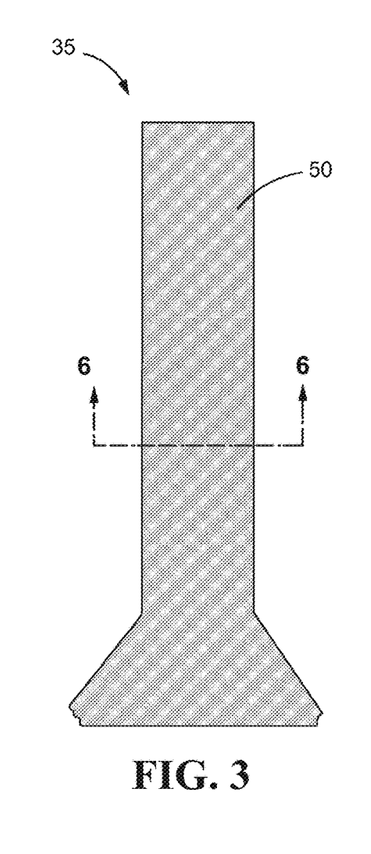
FIG. 3 is front view of a component constructed in accordance with the present disclosure.
Figure 4:
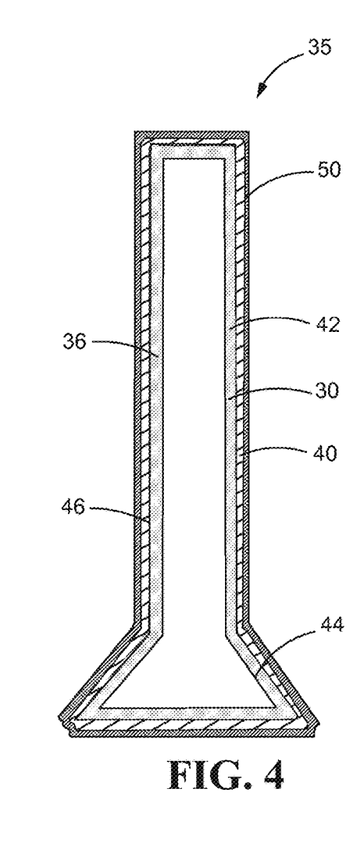
FIG. 4 is a cross-sectional view of the component of FIG. 3, constructed in accordance with the present disclosure.
Figure 5:
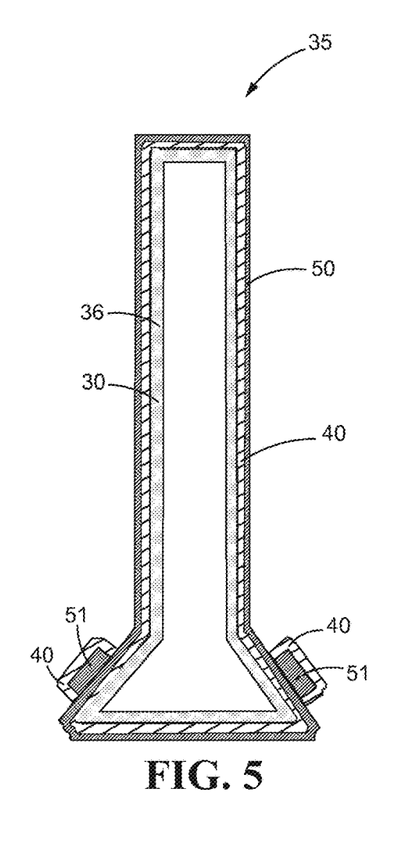
FIG. 5 is a cross-sectional view similar to FIG. 4, but having a sacrificial layer deposited on wear pads constructed in accordance with the present disclosure.

A component 35 having a structure 36 that is protected from localized corrosion with a sacrificial layer 40 is depicted in FIGS. 3-5. The structure 36 may be formed, at least in part, from an aluminum alloy or aluminum and it may be an airfoil 30 of the fan 12, as shown, or another structure such as a compressor airfoil in the compressor section 18. Alternatively, the structure 36 may be any other structure formed, at least in part, from an aluminum alloy or aluminum that may benefit from protection against localized corrosion. If the structure 36 is the airfoil 30, it may have a blade or airfoil portion 42 and a root portion 44, as best shown in FIG. 4. The root portion 44 may be received by a respective slot in the hub 32 to retain the airfoil 30 in the hub 32.

The sacrificial layer 40 may be formed from an aluminum alloy or a zinc alloy that is more anodic than the aluminum alloy or aluminum forming the structure 36, such that the sacrificial layer 40 may be more easily corroded than the underlying structure 36. The sacrificial layer 40 may be in electrical contact with the structure 36 either through direct metal-to-metal contact, as shown, or by introduction of an electrical bridge, such as a carbon bridge. When in electrical contact with the structure 36, the sacrificial layer 40 may reduce or eliminate localized corrosion of the structure 36 by a cathodic protection mechanism in which the structure 36 is protected from corrosion at the expense of corrosive decay of the sacrificial layer 40 (see FIG. 8 and further details below). More specifically, the sacrificial layer 40 may corrode when in the presence of corrosive conditions in the environment (water, electrolyte, and oxygen) until it is substantially worn down before corrosion of the structure 36 may begin. When in the presence of such corrosive conditions, the sacrificial layer 40 and the structure 36 may form a galvanic cell 45 (see FIG. 8 and further details below), with the sacrificial layer 40 forming an anode where metal oxidation and release of electrons (corrosion) takes place and the structure 36 forming an cathode that accepts the electrons released from the oxidation reactions occurring at the sacrificial layer 40. In this regard, it is noted that the protection of the structure 36 by the sacrificial layer 40 may persist until the sacrificial layer 40 is substantially corroded away or otherwise worn down.

The sacrificial layer 40 may also contain one or more anodic elements that may lower the electrochemical potential of the sacrificial layer 40 such that it is more anodic than the aluminum alloy forming the structure 36 in order to provide a driving force for the preferential corrosion of the sacrificial layer 40. The content and identity of the anodic element(s) in the sacrificial layer 40 may be selected such that the electrochemical potential of the sacrificial layer 40 to is reduced to at least about 100 mV lower than the electrochemical potential of the aluminum or aluminum alloy material forming the structure 36. However, other electrochemical potential differences between the sacrificial layer 40 and the structure 36 may also be selected. The introduced anodic element(s) may be metals in the galvanic series that are less noble than aluminum. In particular, the anodic element(s) may be selected from zinc, magnesium, beryllium, and combinations thereof. Furthermore, the content of the anodic element(s) in the sacrificial layer 40 may be in the range of about 0.25 weight % to about 10 weight %, but other weight percentages may also be used.

If the sacrificial layer 40 is formed from an aluminum alloy, it may develop a passive metal oxide film on its surface that may act as a barrier to corrosion of the sacrificial layer 40 and thereby preclude cathodic protection of the underlying structure 36. Accordingly, the sacrificial layer 40 may also contain one or more elements that are capable of destabilizing the passive metal oxide film that may develop on its surface, thereby advantageously allowing the sacrificial layer 40 to corrode. Such metal oxide destabilizing elements may be selected from indium, tin, barium, magnesium, mercury, gallium, thallium, and combinations thereof. The content of the metal oxide destabilizing element(s) in the sacrificial layer may be less than about 1 weight %, but other contents may also be used. As one possible arrangement, the sacrificial layer 40 may be predominantly formed from an aluminum alloy that contains from about 0.25 to about 5 wt % zinc and an element selected from the group consisting of indium, barium, magnesium, mercury, gallium, thallium, and combinations thereof.

The sacrificial layer 40 may also contain one or more particle-forming elements selected from iron, silicon, and combinations thereof to further destabilize the passive metal oxide film and promote corrosion of the sacrificial layer 40. Such particle-forming elements may form intermetallic particles that penetrate the passive metal oxide film while forming local anodes and cathodes that break down the passive metal oxide film. Such particle-forming elements may be present in the sacrificial layer 40 at contents up to about 1 weight %, but other contents of particle-forming elements may also be used. As one possible arrangement, the sacrificial layer 40 may be predominantly formed from an aluminum alloy containing from about 0.25 to about 5 wt % zinc and an element selected from the group consisting of iron, silicon, and combinations thereof.

As shown in FIG. 4, the sacrificial layer 40 may be deposited on at least a portion of, or all of, an outer surface 46 of the structure 36. If the structure 36 is an airfoil 30, the sacrificial layer 40 may be deposited on the outer surfaces 46 of either or both of the blade portion 42 and the root portion 44. In particular, the root portion 44 of the airfoil may be targeted for corrosive protection with the sacrificial layer 40 due to its tendency to trap moisture and corrode as well as its susceptibility to mechanical stress that may lead to cracking after corrosion of the root portion 44. Furthermore, the sacrificial layer 40 deposited on the outer surface 46 of the structure may be covered with an optional coating 50 which may further protect the underlying structure 36. The coating 50 may be a paint coating such as, but not limited to, a chromated epoxy based primer. Importantly, the coating 50 may further extend the life of the underlying structure 36 as the sacrificial layer 40 will not begin to corrode until the coating 50 is sufficiently worn down and the sacrificial layer 40 becomes exposed to the corrosive conditions in the atmosphere. Once the coating 50 is worn down and the sacrificial layer 40 has been sufficiently corroded away to expose the underlying structure 36, a new sacrificial layer 40 and/or a new coating 50 may be applied to the outer surface 46 of the structure 36. As an alternative arrangement, the component 35 may lack the coating 50 and the sacrificial layer 40 may be directly exposed to the outside environment. The thickness of the sacrificial layer 40 may be between about 0.5 mil (about 0.013 mm) to about 20 mil (about 0.5 mm), but other layer thicknesses may also suffice. In addition, the thickness of the coating 50 may be between about 1 mil (0.025 mm) to about 10 mil (0.25 mm), but other coating thicknesses may also suffice.

As another alternative arrangement, if the structure 36 is an airfoil 30, it may have one or more wear pads 51 which may also have a sacrificial layer 40 deposited on at least a portion of their outer surfaces, as shown in FIG. 5. The wear pads 51 may be positioned on or near the root portion 44 of the airfoil 30 to protect the root portion 42 from abrasive wear caused by impact with the slot of the hub 32 that receives it. Alternatively, only the wear pads 51 and not the outer surface 46 may be protected by the sacrificial layer 40.

Figure 6:
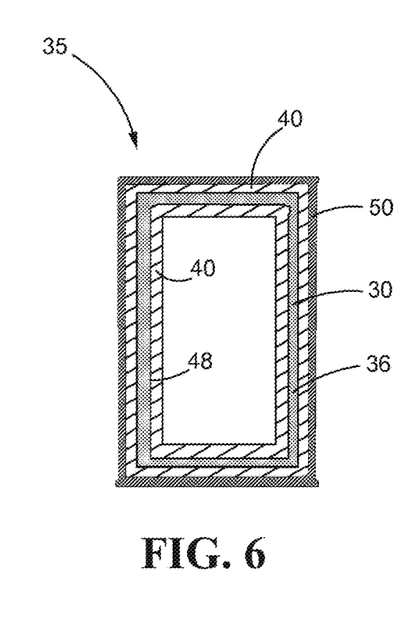
FIG. 6 is a cross-sectional view through the section 6-6 of FIG. 3, illustrating a sacrificial layer applied to an inner surface of the structure, constructed in accordance with the present disclosure.

In addition to protecting the outer surface 46 of the structure, the sacrificial layer 40 may also be deposited on at least a portion of an inner surface 48 of the structure 36, as best shown in FIG. 6. Alternatively, the sacrificial layer 40 may be deposited only on the inner surface 48. It is noted that if the structure 36 is an airfoil 30, the inner surfaces 48 may be particularly susceptible to corrosion due to their tendency to collect air and moisture during aircraft landing due to pressure differentials between the outside atmosphere and the interior hollow space of the airfoil 30.

Figure 7:
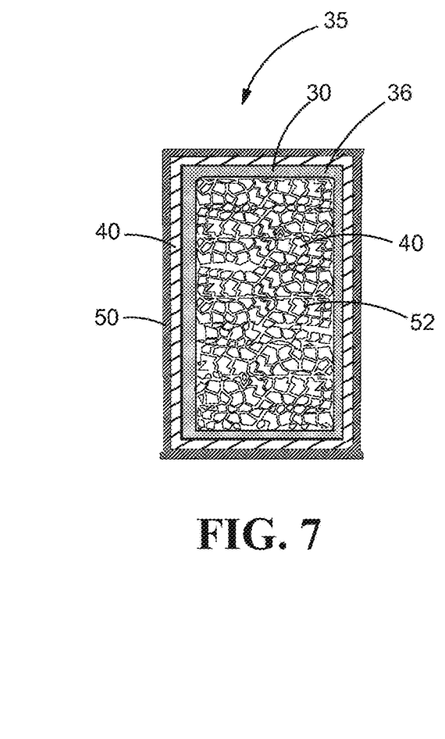
FIG. 7 is a cross-sectional view similar to FIG. 6, but illustrating a sacrificial layer applied to the inner surface of the structure as a metallic foam, constructed in accordance with the present disclosure.

The sacrificial layer 40 may be applied as uniform layer or coating on the outer surface 46 and/or inner surface 48 of the structure 36 such that it is in electrical contact (metal-to-metal contact) with the aluminum or aluminum alloy material of the structure 36, as shown in FIGS. 4-6. The sacrificial layer 40 may be deposited on the outer surface 46, the inner surface 48, and/or the wear pads 51 by one or more methods understood by those of ordinary skill in the art. Such methods may include, but are not limited to, cold spraying, electroplating, chemical vapor deposition, physical vapor deposition, plasma spraying, slurry application, sintering, direct metal laser sintering, diffusion bonding, bonding as a cladded sheet structure, or any other method chosen by a skilled artisan. As an alternative arrangement, the sacrificial layer 40 may be deposited on the inner surface 48 of the structure 36 as a metallic foam 52, in which case it may be deposited as a foam layer or as a filling that may fill the interior cavity of the structure 36, as shown in FIG. 7. Those of ordinary skill in the art will understand the deposition techniques which may be used to generate such a metallic foam coating.

Figure 8:
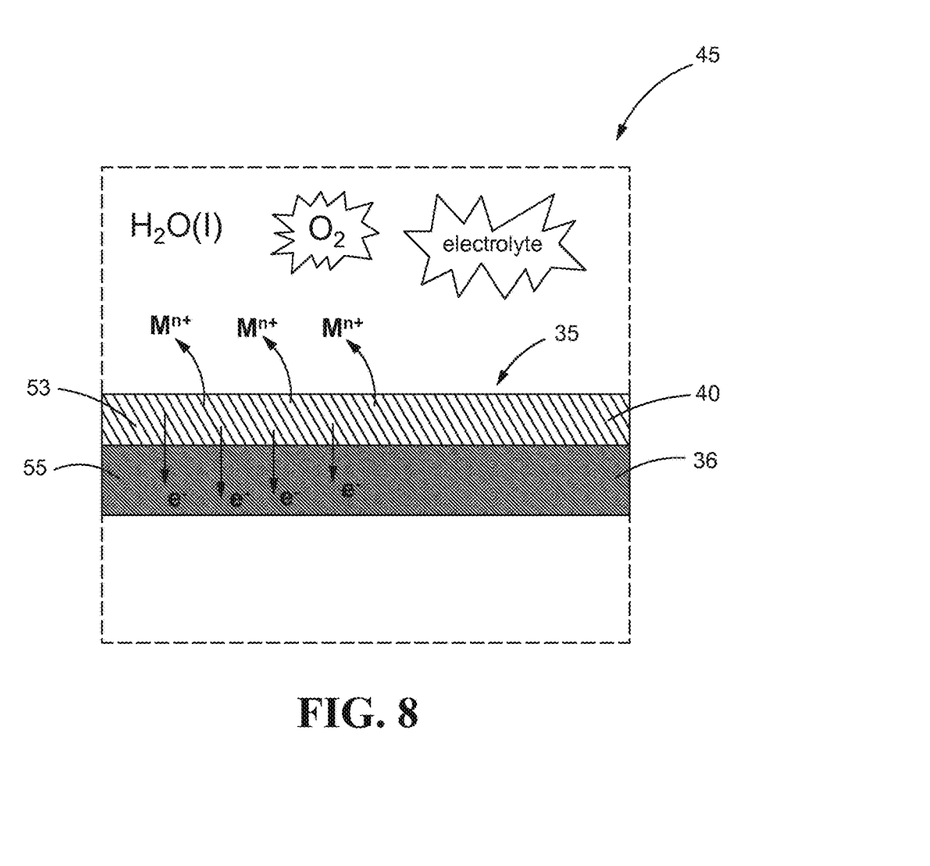
FIG. 8 is a schematic representation illustrating a mechanism of cathodic protection of the structure by the sacrificial layer in accordance with the present disclosure.

A possible mechanism of cathodic protection of the structure 36 by the sacrificial layer 40 is depicted schematically in FIG. 8. When exposed to corrosive conditions in the environment (water, oxygen, and electrolytes), the sacrificial layer 40 may act as an anode 53 and the structure 36 may act as a cathode 55, as shown. Oxidation (corrosion) of the sacrificial layer 40 may occur upon exposure to the corrosive conditions, causing oxidized metal ions ($M^{n+}$) of the sacrificial layer 40 to be dissolved into the atmosphere and the wearing away of the sacrificial layer 40. As the sacrificial layer 40 and the structure 36 may be in electrical contact, the electrons released from the oxidation reactions may be shuttled to the structure 36, as shown. This process may protect the structure 36 from corrosion until the sacrificial layer 40 is substantially corroded away.

Figure 9:
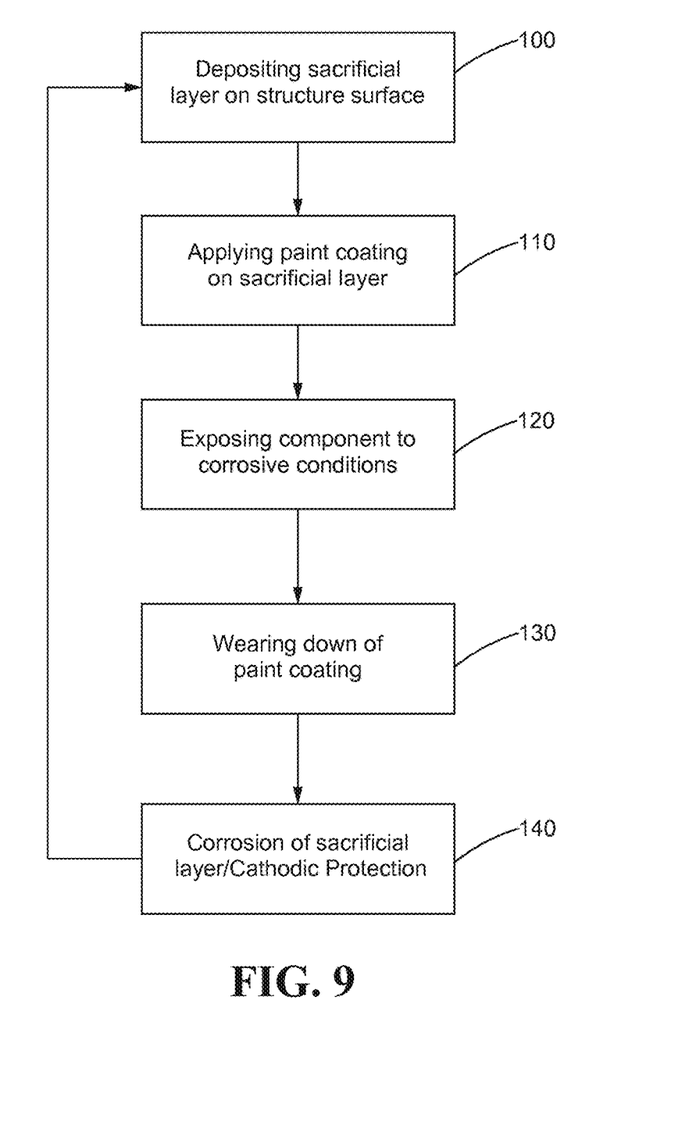
FIG. 9 is a flow chart illustrating steps involved in the fabrication of the component and the protection of the underlying structure, in accordance with a method of the present disclosure.

FIG. 9 illustrates a series of steps which may be involved in the fabrication of the component 35 and the protection of the underlying structure 36 against localized corrosion. According to a first block 100, the sacrificial layer 40 may be deposited by one of the above-described methods on at least a portion of the outer surface 46 and/or the inner surface 48 of the structure 36, as shown. Optionally, a paint coating (coating 50) may also be applied on the sacrificial layer 40 according to a next block 110. Once at least the sacrificial layer 40 has been deposited on a surface of the structure, the component 35 may be provided. The component 35 may then be exposed to corrosive conditions in the environment during use (such as during operation of the fan 12) according to a next block 120, as shown. According to a block 130, the optional coating 50 may be worn down over time eventually exposing the sacrificial layer 40 to the atmosphere. Once sufficiently exposed, the sacrificial layer 40 may begin to corrode according to a block 140, initiating the cathodic protection mechanism illustrated in FIG. 8. The sacrificial layer 40 may be corroded away over time, eventually exposing the underlying structure 36 to corrosive conditions in the environment. Accordingly, a new sacrificial layer 40 and an optional coating 50 may be re-applied to the surface(s) of the structure 36 according to the blocks 100 and 110, respectively, as shown. It is noted that the reapplication of the sacrificial layer 40 may be less expensive than replacement of the structure 36. The sacrificial layer 40 (and the optional coating 50) may be re-applied to the surface of the structure 36 as desired to provide continual protection against localized corrosion.

INDUSTRIAL APPLICABILITY

From the foregoing, it can therefore be seen that the present disclosure can find industrial applicability in many situations, including, but not limited to, construction of gas turbine engine fans having enhanced resistance against corrosion. The present disclosure provides a sacrificial layer that may be applied to selected surfaces of aluminum alloy or aluminum structures to protect the structures from localized corrosion by a cathodic protection mechanism. The sacrificial layer may be formed from an aluminum alloy and may include one or more anodic elements to drive preferential corrosion of the sacrificial layer over the underlying structure. As disclosed herein, the sacrificial layer may also include one or more elements capable of destabilizing the passive oxide film on the surface of the sacrificial layer in order to further promote corrosion of the sacrificial layer. Once the sacrificial layer is consumed by corrosion, a new sacrificial layer may be applied to the selected surfaces of the structure to continue protection as desired. The protection strategy as disclosed herein may find wide industrial applicability in a wide range of areas requiring aluminum or aluminum alloy structures exhibiting enhanced resistance against corrosion, such as aircraft and automotive industries.

What is claimed is:

1. A component, comprising:
   a structure formed from a material selected from the group consisting of aluminum and an aluminum alloy, the structure being an airfoil of a gas turbine engine; and
   a sacrificial layer in electrical contact with at least a portion of a surface of the structure, the sacrificial layer protecting the surface from localized corrosion and comprising an alloy that is more anodic than the material forming the structure, the alloy being selected from the group consisting of an aluminum alloy and a zinc alloy, wherein the sacrificial layer is deposited on an outer surface and an inner surface of the airfoil, wherein the sacrificial layer deposited on the inner surface of the structure is a metallic foam.

2. The component, according to claim 1, wherein the sacrificial layer comprises an anodic element that is one of zinc, magnesium, beryllium, and combinations thereof.

3. The component, according to claim 2, wherein the sacrificial layer has an electrochemical potential at least about 100 mV lower than the electrochemical potential of the material forming the structure.

4. The component, according to claim 2, wherein the anodic element is present in a range from about 0.25 wt % to about 10 wt %.

5. The component, according to claim 2, wherein the sacrificial layer further comprises a first element that is one of indium, barium, magnesium, mercury, gallium, thallium, and combinations thereof combined into a predominately aluminum alloy or layer that also contains from about 0.25 to about 5% zinc.

6. The component, according to claim 5, wherein the sacrificial layer further comprises a second element that is one of iron, silicon, and combinations thereof combined into a predominately aluminum alloy or layer that also contains from about 0.25 to about 5% zinc.

7. The component, according to claim 5, wherein the first element is present in the sacrificial layer at less than about 1 wt %.

8. The component, according to claim 6, wherein the second element is present in the sacrificial layer up to about 1 wt %.

9. The component, according to claim 6, wherein the sacrificial layer is deposited on the structure by at least one deposition method that is one of cold spraying, electroplating, chemical vapor deposition, physical vapor deposition, plasma spraying, slurry application, sintering, and diffusion bonding.

10. The component, according to claim 6, further comprising a paint coating on the sacrificial layer.

11. The component, according to claim 1, wherein the sacrificial layer is deposited on a wear pad of the airfoil.

12. An airfoil for a fan of a gas turbine engine comprising:
    a blade portion;
    a root portion, the fan blade being formed from a material selected from the group consisting of aluminum and an aluminum alloy; and
    a sacrificial layer in electrical contact with at least a portion of a surface of the airfoil, the sacrificial layer protecting the surface from localized corrosion and comprising an alloy that is more anodic than the material forming the fan blade, the alloy being selected from the group consisting of an aluminum alloy and a zinc alloy, wherein the sacrificial layer is deposited on an inner surface of the structure as a metallic foam.

13. The airfoil, according to claim 12, wherein the sacrificial layer comprises an anodic element that is one of zinc, magnesium, beryllium, and combinations thereof.

14. The airfoil, according to claim 13, wherein the sacrificial layer further comprises a first element that is one of indium, barium, magnesium, mercury, gallium, thallium, and combinations thereof.

15. The airfoil, according to claim 14, wherein the sacrificial layer further comprises a second element that is one of iron, silicon, and combinations thereof.

16. A gas turbine engine, comprising:
    a fan section having a plurality of airfoils, at least one of the plurality of airfoils being formed from a material selected from the group consisting of aluminum and an aluminum alloy;
    a sacrificial layer in electrical contact with a portion of a surface of the at least one of the plurality of airfoils, the sacrificial layer protecting the surface from localized corrosion and comprising an alloy that is more anodic than the material, the alloy being selected from the group consisting of an aluminum alloy and a zinc alloy, wherein the sacrificial layer is deposited on an outer surface and an inner surface of the airfoil, and wherein the sacrificial layer is-deposited on the inner surface of the structure is a metallic foam;
    a compressor section downstream of the fan;
    a combustor section downstream of the compressor;
    a turbine section downstream of the combustor; and
    a nacelle surrounding the fan, the compressor section, the combustor section, and the turbine section.

17. A gas turbine engine, comprising:
    a fan;
    a compressor section downstream of the fan, the compressor section having a plurality of airfoils, at least one of the plurality of airfoils being formed from a material selected from the group consisting of aluminum and an aluminum alloy;
    a sacrificial layer in electrical contact with a portion of a surface of the at least one of the at least one of the plurality of airfoils, the sacrificial layer protecting the surface from localized corrosion and comprising an alloy that is more anodic than the material, the alloy being selected from the group consisting of an aluminum alloy and a zinc alloy, wherein the sacrificial layer is deposited on an inner surface of the structure as a metallic foam;
    a combustor section downstream of the compressor;
    a turbine section downstream of the combustor; and
    a nacelle surrounding the fan, the compressor section, the combustor section, and the turbine section.

* * * * *